(12) United States Patent
Roth et al.

(10) Patent No.: US 6,452,288 B1
(45) Date of Patent: Sep. 17, 2002

(54) METHOD AND DEVICE FOR SENSING AND OBJECT OR A PERSON IN THE INTERIOR OF A VEHICLE

(75) Inventors: Christoph Roth, Tokyo (JP); Alexander Waldmann, Regensburg (DE); Reinhard Hamperl, Koefering (DE); Thomas Stierle, Regensburg (DE); Reinhard Roesl, Wenzenbach (DE); Gerhard Mader, Thalmassing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/513,612

(22) Filed: Feb. 25, 2000

(30) Foreign Application Priority Data

Feb. 25, 1999 (EP) .............................. 99103694

(51) Int. Cl.⁷ ................................ H02G 3/00
(52) U.S. Cl. .................... 307/10.1; 280/785; 701/45
(58) Field of Search ............... 307/10.1, 9.1; 280/735; 701/45; 372/38.02

(56) References Cited

U.S. PATENT DOCUMENTS

| | | | |
|---|---|---|---|
| 5,225,850 A | * | 7/1993 | Egawa et al. ................ 346/108 |
| 5,446,661 A | * | 8/1995 | Giutsos et al. ......... 364/424.05 |
| 5,490,069 A | | 2/1996 | Gioutsos et al. |
| 5,585,625 A | | 12/1996 | Spies |
| 5,653,462 A | | 8/1997 | Breed et al. |
| 6,246,651 B1 | * | 6/2001 | Fukinuki et al. ........... 369/53.3 |

FOREIGN PATENT DOCUMENTS

| | | |
|---|---|---|
| EP | 0669227 A1 | 8/1995 |
| EP | 0734921 A2 | 10/1996 |

* cited by examiner

Primary Examiner—Brian Sircus
Assistant Examiner—Robert DeBeradinis
(74) Attorney, Agent, or Firm—Laurence A. Greenberg; Werner H. Stemer; Ralph E. Locher

(57) ABSTRACT

In order to sense an object or a person in the interior of a vehicle, a laser emits a laser pulse. The laser pulse which is reflected at an object or a person is registered and evaluated. The energy content of a following laser pulse is determined based on a characteristic variable of the reflected laser pulse such as its power or its energy content.

11 Claims, 2 Drawing Sheets

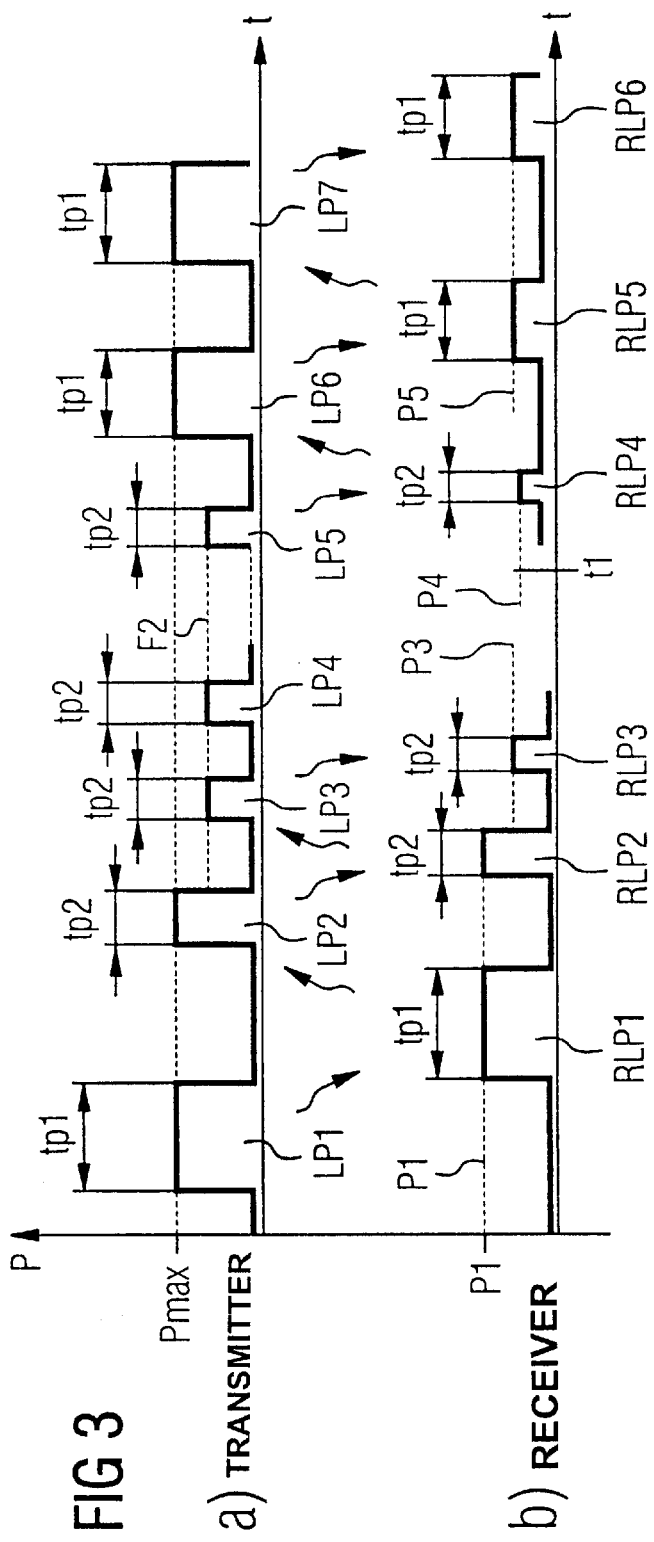
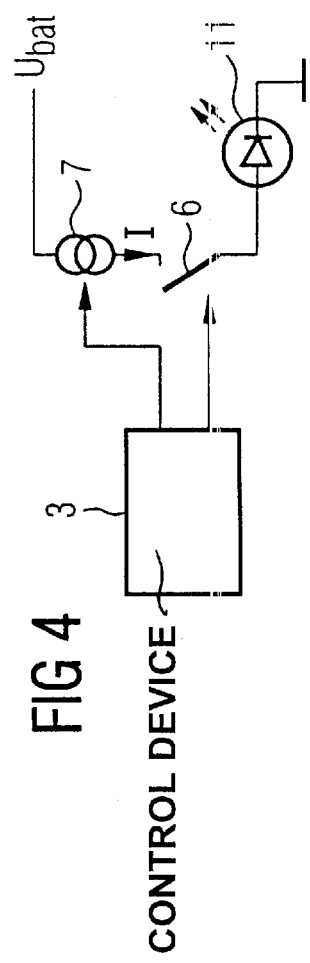

METHOD AND DEVICE FOR SENSING AND OBJECT OR A PERSON IN THE INTERIOR OF A VEHICLE

BACKGROUND OF THE INVENTION:

Field of the Invention:

The invention lies in the automotive technology field. More specifically, the invention relates to a device for sensing an object or a person in the interior of a vehicle. The device is of the type including a laser for emitting laser pulses and an optical receiver for receiving laser pulses which are reflected or diffracted at an object or at a person.

Persons who are displaced far forward in the direction of the dashboard—such as children in so-called rearward facing baby seats on the front-seat passenger seat—are subjected to the hazard, during the operation of a motor vehicle provided with an airbag, of suffering injuries as result of the inflation impact of the airbag in the event of an accident. Modern control systems for personal protection aim at switching off the airbag in such situations or inflating it with reduced force and speed in order to avoid the risk of injury to a vehicle occupant. In order to determine the position of the vehicle occupant in the vehicle, use is preferably made of contactless, optical sensors. European published patent application No. 0 669 227 A1 discloses a device for the contactless detection of an object or of a person in the interior of a vehicle. There, the vehicle seat is irradiated by a number of LEDs. The beams which are reflected from the seat or a person or an object on the vehicle seat are registered by a photodetector field.

The light source used for the optical detection system is preferably a laser which permits positionally precise sensing owing to its monochrome radiation. Laser diodes, and in particular semiconductor laser diodes, are usually used as transmitters.

In order to avoid continuous loading of persons in the interior of the vehicle with energy from the laser, the laser is operated in a pulsed fashion. However, even in this mode of operation, the health of the vehicle occupant must not be adversely affected by the emitted laser pulses in any way.

Furthermore, the known device has the disadvantage that the optical receiver receives a reflected laser pulse with a very high energy content if an object is disposed in very close vicinity to the laser and the transmission pulse has a high energy content. Owing to the short distance between the optical detection apparatus and the object, only a small amount of the emitted energy is lost. This effect is amplified if the object has a highly reflective effect. Given such a large absorption of energy by the optical receiver, there is the hazard that the amplifier which is connected downstream may be operated in the saturation region, and precise detection of the object or of the distance between the object and the optical detection apparatus may thus no longer be possible.

SUMMARY OF THE INVENTION:

It is accordingly an object of the invention to provide a device and a method for detecting animate or inanimate objects in the vehicle interior, which overcomes the above-mentioned disadvantages of the heretofore-known devices and methods of this general type and which is improved and further developed in such a way that any hazard to persons in the interior owing to the emitted laser radiation can be prevented at any time, and at the same time correct detection data are made available.

With the foregoing and other objects in view there is provided, in accordance with the invention, a device for sensing an object (inanimate object or person) in the interior of a vehicle, comprising:

a laser for emitting laser pulses;

an optical receiver for receiving laser pulses reflected or scattered at an object in an interior of a vehicle;

a control apparatus connected to the laser and to the optical receiver for setting an energy content of a following laser pulse as a function of a characteristic variable of a registered or reflected laser pulse.

In accordance with an added feature of the invention, the control apparatus sets a transmission power of the laser.

In accordance with an additional feature of the invention, the control apparatus sets a pulse length of the laser pulse.

In accordance with yet an additional feature of the invention, the control apparatus sets a pulse length for a predefined laser power and sets a laser power differently from the predefined laser power as soon as a pulse length drops below a predefined limiting value.

In accordance with another feature of the invention, the control apparatus reduces the energy content of the following laser pulse based on a current energy content thereof if the characteristic variable of the reflected laser pulse exceeds an assigned sensitivity limiting value.

In accordance with a further feature of the invention, the control apparatus increases the energy content of the following laser pulse based on a current energy content thereof if the characteristic variable of the reflected laser pulse drops below an assigned sensitivity limiting value.

In accordance with again an added feature of the invention, the control apparatus increases the energy content of the following laser pulse only up to an assigned hazard limiting value.

In accordance with again an additional feature of the invention, the optical receiver includes a plurality of receiver elements connected to interact with the laser, and wherein the control apparatus is adapted to increase or decrease the energy content of the following laser pulse based on the current energy content thereof if the characteristic variable of at least one of the reflected laser pulses registered by the receiver elements drops below or exceeds an assigned limiting value.

In accordance with a concomitant feature of the invention, the characteristic variable is defined as a strength or a power or an energy content of the reflected laser pulse.

With the above and other objects in view there is also provided in accordance with the invention, a method for sensing an object in an interior of a vehicle, and particularly a method for operating the above-outlined device.

The method comprises:

emitting a laser pulse;

registering the reflected laser pulse after reflection at an object; and determining an energy content of a following laser pulse to be emitted from a characteristic variable of the reflected laser pulse.

In this context, a control apparatus is provided which sets the energy content of a laser pulse as a function of a characteristic variable which is acquired by evaluating a reflected laser pulse. Here, the reflected laser pulse which is received directly before the recent emission of the laser pulse is preferably evaluated. The energy which is output by the laser is thus reduced at all times to an amount which is, on the one hand, sufficient to detect an object or a person to an adequately defined degree, but on the other hand avoids any hazard to vehicle occupants. The device is thus operated in an optimized way in terms of its detection sensitivity and its radiation loading.

The energy content of an emitted laser pulse is determined via the product of the transmission power and pulse length. The control apparatus which is preferably designed as a microprocessor or else as a circuit with discrete components preferably adjusts either the transmission power of the laser or the pulse length. The transmission power is preferably set by means of an operating current of the laser.

Characteristic variables of a registered, reflected laser pulse are, in particular, its strength/amplitude or its power or its energy content. In such a case, the optical receiver is usually a converter which converts optical signals into electrical signals. Consequently, the control apparatus preferably registers an electrical signal which is supplied by such an optical receiver, and evaluates one or more of the characteristic variables described above.

An advantageous control specification is explained below with reference to the evaluation of the energy content of a registered, reflected laser pulse. The energy content of the reflected laser pulse is determined by the product of the power and pulse length. The control specification provides that, in the event of the energy content of the reflected laser pulse being above a sensitivity limiting value—which characterizes the energy content of a reflected laser pulse which is just sufficient to detect an object or a person—, the energy content of the following transmit-end laser pulse is reduced starting from its previous, current energy content. The evaluation-of the reflected laser pulse has shown that the device is operated with a laser power which is too high to sense an object or a person. The laser power is therefore reduced. In this context, the device may be designed as an adjustment device which adjusts the energy content of the reflected laser pulse as a regulating variable to the predefined sensitivity limiting value as a setpoint value.

If, on the other hand, a reflected laser pulse is received with an extremely low energy content, according to the invention the laser power is increased, at least until the sensitivity limiting value can be sensed as energy content at the receive end.

The energy content of a reflected laser pulse in such a device is determined essentially by the distance between an object at which the emitted laser pulse is reflected, and the optical receiver and in particular by the diffraction properties of the irradiated object or the irradiated person. The further the object is away, the smaller the energy content of the reflected laser pulse. The brighter the surface of the object, the better the diffraction properties which it has. In one advantageous development of the invention, the control apparatus determines the energy content or the power or the amplitude of the reflected laser pulse in order to be able to detect the distance and thus the position of the object or of the vehicle occupant. On the basis of these properties of the device, the transmission power will be regularly adapted if the distance between an object or a person and the sensing device changes significantly.

The risk that the transmit power of the laser is set at increasingly high levels, and thus of instability of the adjustment owing to the fact that there are no reflected laser pulses, or weakly received reflected laser pulses during the emission of a laser pulse "into the void" is countered by the arrangement of the device: owing to the function of the device, the laser will sense either a vehicle seat or the hazard area in front of an airbag. Even if an object or a vehicle occupant is not present, the laser will always be directed onto a permanently installed vehicle structure which is at a maximum distance of approximately one meter from the sensing device. If the laser is intended to sense the hazard area in front of an airbag, and is therefore arranged in the roof lining, a laser pulse which is emitted is at least reflected by the footwell of the vehicle. In one advantageous development of the invention, the problem of unstable adjustment is additionally solved by virtue of the fact that the energy content of an emitted laser pulse is limited to a hazard limiting value. This provides a means of preventing high-energy laser power, which thus presents a hazard to vehicle occupants, from being emitted, in addition to the fact that the sensing apparatus is, as described above, arranged opposite a vehicle structure.

Other features which are considered as characteristic for the invention are set forth in the appended claims.

Although the invention is illustrated and described herein as embodied in a method and device for sensing an object or a person in the interior of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS:

FIG. 3 is a double time graph showing signal profiles representing the method according to the invention; and FIG. 4 is a schematic diagram of the controller of a laser of a device according to the invention.

Figure 1:
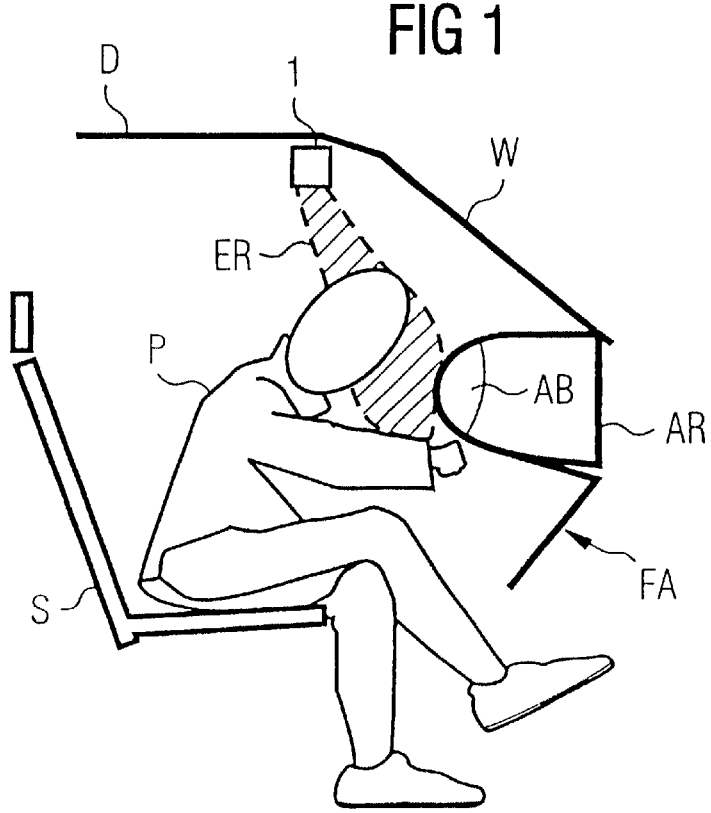
FIG. 1 is a diagrammatic section through a passenger cell of a method vehicle.

DESCRIPTION OF THE PREFERRED EMBODIMENTS:

FIG. 1 shows a cross section of the front part of the passenger cell, on the front-seat passenger's side, all the elements being drawn symbolically. The interior of the vehicle is bounded by a roof D, a windshield W, a dashboard AR and a footrest FA. It will be understood, however, that the roof D need not necessarily be present and that the passenger cell need not necessarily be completely enclosed. A vehicle seat S is shown on which a person P is seated in a position in which the upper part of the body is displaced forward. A device V for sensing an object or a person is arranged on the roof D. This apparatus has an indicated effective range ER. The dashboard AR contains a front-seat passenger airbag module AB in the folded-up state. In the unfolded state, the front-seat passenger airbag shoots in the direction towards the head of the person P. It is clear that with the indicated apparatus for detecting objects, the hazard area in front of a folded-up airbag module AB is to be monitored in the inflation direction. If an occupant or a baby seat is detected in this effective range ER, the front-seat passenger airbag module AB is prevented from being triggered, or is triggered in a suitably metered fashion. However, the device V can be directed at the vehicle seat S and sense when a person moves out of his normal seated position. Devices are also known which can sense the entire front part of the interior of the vehicle with a plurality of sensors and register any types of positions of objects or persons. The invention is therefore not restricted to specifically detecting an image of an object or of a person, but instead in particular also for monitoring a specific region or a specific zone in the interior of the vehicle for the presence of an object or a person. The apparatus is designed to register in a contactless fashion.

The sensor of the device senses its effective range by means of optical radiation, in particular infrared radiation. However, radiation with other wavelengths can also be applied. The sensor contains an LED, in particular an infrared transmitter in the form of a laser diode which emits one or more beams or beam curtains. The sensor also contains one or more optical receiver elements in the form of photocells which receive the radiation that is reflected or diffracted at an object or a person. By evaluating the reflected radiation, the distance between the sensor and the object, as well as if appropriate contouring and precise determination of the position, can be determined in two-dimensional or three-dimensional space. The sensor preferably projects a plurality of beam curtains which are positioned one behind the other in the direction of travel in the vertical plane, and contains, along the transverse axis of the vehicle, a plurality of receiver elements per beam curtain. This ensures three-dimensional detection of persons or objects because each receiver element supplies an item of two-dimensional information, and the third, vertical dimension is acquired by means of an evaluation of the strength, the power or the energy content of a reflected radiation item. A detection apparatus with simple technical means has, for example, just one photoelectric barrier which senses the unfolding space of the airbag. A position of an object or person is preferably determined using the methods of measuring propagation time, or of triangulation.

Figure 2:
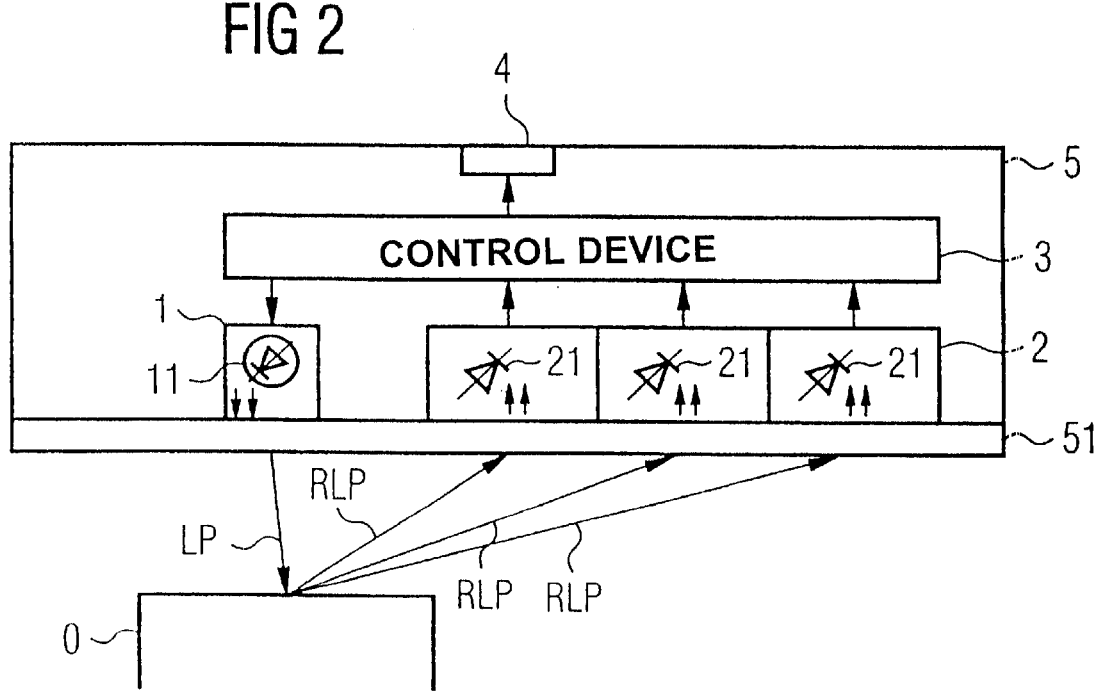
FIG. 2 is a schematic block circuit diagram of the device according to the invention.

FIG. 2 shows the block circuit diagram of a device according to the invention. Here, a housing 5 contains a laser 1 with a laser diode 11 and an optical receiver 2 with three receiver elements 21 which are implemented as photodiodes, and a control apparatus 3. To determine the presence of an object in the beam path of the laser pulse LP, it is sufficient to embody the optical receiver 2 with one receiver element 21. If a plurality of receiver elements 21 are provided, in addition to the presence of an object it is also possible to detect its position. The laser 1 emits a laser pulse LP in the infrared range. The pulse LP is reflected at an object O and is sensed, as a reflected laser pulse RLP, by at least one of the receiver elements 21.

The function of the device is characterized in the outward direction by arrows representing signals and in the incoming direction on the control apparatus 3. The control apparatus 3 controls the operation of the laser 1. It receives signals from the photoelements 21 and evaluates them. The evaluation results are transmitted via an interface 4 to a controller for the vehicle occupant protection means which is disposed at a distance from the object detection device.

FIG. 3 shows a signal sequence which represents the method according to the invention. Laser pulses LP which are emitted by the laser 1 as transmitter are plotted in diagram 3a) with a power P over time t. Diagram 3b) shows reflected, sensed laser pulses RLP with a power P over time t. Here, an action arrow characterizes the classification of a sensed, reflected laser pulse RLP as a reaction to an emitted laser pulse LP. In the opposite direction of action of the reflected laser pulses RLP to the following laser pulses LP, action arrows are also given, thoes arrows indicating a modification of the laser pulse LP in reaction to the evaluation of the preceding reflected laser pulse RLP in the sense according to the invention.

A laser pulse LP1 is initially output with a limit rating $P_{max}$ and a pulse length tp1. The energy content of this laser pulse LP1 is obtained as the product of its pulse length tp1 and its power $P_{max}$. At the start of a sensing operation, a high-energy laser pulse LP1 with maximum power and maximum pulse duration is preferably always emitted so that an object which may possibly be far away can also be detected sufficiently. The method according to the invention then provides the possibility of adjusting the energy content of the following laser pulses LP.

According to FIG. 3, a reflected laser pulse RLP1, which also has the pulse length tp1 and a power $P1<P_{max}$, is sensed by the optical receiver in reaction to the emitted laser pulse LP1. The control apparatus 3 detects, by evaluating the energy content of the reflected laser pulse RLP1, an object which is arranged relatively near to the sensing device and which also has good reflective properties. Owing to the spatial arrangement of this object, it is then no longer necessary to emit laser pulses with the maximum energy content. The control apparatus 3 then emits a laser pulse LP2 with the identical maximum laser power $P_{max}$ but a smaller pulse width tp2<tp1, and thus reduced energy content. The reflected laser pulse RLP2 in reaction to the laser pulse LP2 is in turn sensed and evaluated. The energy content of the reflected laser pulse RLP2 is compared with a predefined sensitivity limiting value—as is that of the reflected laser pulse RLP1. The energy content of the reflected laser pulse RLP2 will be assumed here to continue to be greater than this sensitivity limiting value which is stored in a memory of the control apparatus 3, with the result that a laser pulse LP3 is then emitted whose power $P2<P_{max}$ is reduced. The pulse length tp2 will be assumed to be retained because this pulse length tp2 will be assumed to be the technologically conditioned minimum pulse length of the system comprising the control apparatus 3 and laser 1. The reflected laser pulse RLP3 which has its origins in the laser pulse LP3 now has an energy content which is determined by a power P3 and the pulse length tp2 and which is in turn compared with the sensitivity limiting value. This energy content then corresponds to the sensitivity limiting value, with the result that the device can now be operated in an energy-optimized state with respect to the detected object.

At the time t1, the sensitive object which was previously near to the detection apparatus will be assumed to have moved away from the detection apparatus to a significant degree. The reflected laser pulse RLP4 which is registered on the laser pulse LP5 now just has a power P4 which is significantly less than the power P3. The energy content of the reflected laser pulse RLP4 is therefore below the predefined sensitivity limiting value which characterizes sufficiently precise detection of the object. In reaction to this, the energy content of the following transmission pulse LP6 is in turn increased in accordance with FIG. 3. The laser pulse LP6 has the characteristic variables Pmax and tp1 of the laser pulse LP1 here. Given a transmission power-which is to be increased, the control apparatus can therefore either emit a laser pulse with a maximum energy content or increase the energy content of the preceding laser pulse by a value which is proportional to the difference between the energy content of the reflected laser pulse RLP4 which was detected last and the sensitivity limiting value.

The reflected laser pulse RLP5 with the power P4<P5<P3 will now be assumed to continue to have an energy content below the sensitivity limiting value. This case will not occur with a device which is tuned precisely because a transmission beam of such a device is reflected, at least by a vehicle structure, even without the presence of a person. A signal which is reflected by this vehicle structure at maximum transmission power contains sufficient energy content above the sensitivity limiting value. The hypothetical, reflected laser pulse RLP5 does not result in any increase in the energy content of the following laser pulse LP7 because the maximum energy content of a laser pulse which is to be emitted has already reached a hazard limiting value $P_{max} \times Ttp$. For safety reasons, neither the transmission power nor the pulse length is subsequently increased.

FIG. 4 shows a controller driver of the laser 1 of the device according to the invention. The laser diode 11 is connected here to a controllable current source 7 via an electrically controllable power stage 6 which is designed as a switching transistor. In order to generate laser pulses, the control apparatus 3 switches on the power stage 6 for a predefined pulse length tp. When the power stage 6 is switched on, the transmission power of the laser 1 is determined by the operating current I which is supplied by the controllable current source 7. The control apparatus 3 is designed to control the operating current I of the laser diode 11.

The term "object" as used in the following claims should be understood to cover animate objects as well as inanimate objects, such as, for example, persons, child seats, and the like.

We claim:

1. A device for sensing an object in the interior of a vehicle, comprising:
   a laser for emitting laser pulses;
   an optical receiver for receiving laser pulses reflected or scattered at an object in an interior of a vehicle;
   a control apparatus connected to said laser and to said optical receiver for setting an energy content of a following laser pulse as a function of a characteristic variable of a registered or reflected laser pulse.

2. The device according to claim 1, wherein said control apparatus is adapted to set a transmission power of said laser.

3. The device according to claim 1, wherein said control apparatus is adapted to set a pulse length of said laser pulse.

4. The device according to claim 3, wherein said control apparatus is adapted to set a pulse length for a predefined laser power and to set a laser power differently from the predefined laser power as soon as a pulse length drops below a predefined limiting value.

5. The device according to claim 1, wherein said control apparatus is adapted to reduce the energy content of the following laser pulse based on a current energy content thereof if the characteristic variable of the reflected laser pulse exceeds an assigned sensitivity limiting value.

6. The device according to claim 5, wherein said control apparatus is adapted to increase the energy content of the following laser pulse based on a current energy content thereof if the characteristic variable of the reflected laser pulse drops below an assigned sensitivity limiting value.

7. The device according to claim 6, wherein the control apparatus is adapted to increase the energy content of the following laser pulse only up to an assigned hazard limiting value.

8. The device according to claim 1, wherein said optical receiver includes a plurality of receiver elements connected to interact with said laser, and wherein said control apparatus is adapted to increase or decrease the energy content of the following laser pulse based on the current energy content thereof if the characteristic variable of at least one of the reflected laser pulses registered by said receiver elements drops below or exceeds an assigned limiting value.

9. The device according to claim 1, wherein the characteristic variable is defined as a strength or a power or an energy content of the reflected laser pulse.

10. A method for sensing an object in an interior of a vehicle, which comprises:
    emitting a laser pulse;
    registering the reflected laser pulse after reflection at an object; and
    determining an energy content of a following laser pulse to be emitted from a characteristic variable of the reflected laser pulse.

11. The method according to claim 10, wherein the emitting step comprises emitting the laser pulse with a device according to claim 1.

* * * * *

UNITED STATES PATENT AND TRADEMARK OFFICE
CERTIFICATE OF CORRECTION

PATENT NO. : 6,452,288 B1
DATED : September 17, 2002
INVENTOR(S) : Christoph Roth et al.

It is certified that error appears in the above-identified patent and that said Letters Patent is hereby corrected as shown below:

<u>Title page,</u>
Item [54], should read as follows:

-- METHOD AND DEVICE FOR SENSING AN OBJECT OR A PERSON IN THE INTERIOR OF A VEHICLE --

Signed and Sealed this

Twenty-eighth Day of January, 2003

JAMES E. ROGAN
*Director of the United States Patent and Trademark Office*